Patented Sept. 16, 1947

2,427,578

UNITED STATES PATENT OFFICE 2,427,578

3-SUBSTITUTED 4-HYDROXYCOUMARIN AND PROCESS OF MAKING IT

Mark A. Stahmann, New York, N. Y., and Miyoshi Ikawa and Karl Paul Link, Madison, Wis., assignors to Wisconsin Alumni Research Foundation, Madison, Wis., a corporation of Wisconsin No Drawing. Application April 2, 1945,
Serial No. 586,047

20 Claims. (Cl. 260—333)

Our invention relates to certain new 3-substituted 4-hydroxycoumarins, which have anticoagulant properties; and to the process of making them.

Our new 3-substituted 4-hydroxycoumarins have the following general formula:

(1) 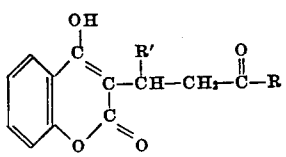

in which R represents a member of the class consisting of alkyl groups (most desirably the methyl group), the phenyl group, and hydroxy-substituted phenyl groups; and R' represents a member of the class consisting of alkyl groups (most desirably the methyl group), the phenyl group, and phenyl groups containing a substituent of the class consisting of the hydroxy group and the methoxy group in at least one of the para and meta positions. By a keto-enol transformation, these 3-substituted 4-hydroxycoumarins may in part exist as the corresponding 3-substituted diketo chromans, which have the following formula:

(2) 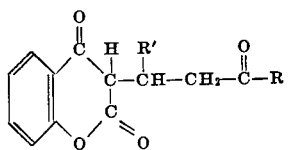

In the formulas in this application we shall in general give only the formulas of the 3-substituted 4-hydroxycoumarins (the enol form) of Formula 1; but we intend that to include the corresponding 3-substituted chromans (the keto form) of Formula 2.

In producing our new 3-substituted 4-hydroxycoumarins, we cause a reaction of 4-hydroxycoumarin with an α-β-unsaturated ketone of the following general formula:

(3) 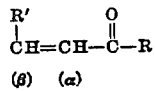

in which R and R' have the same meaning as before.

The reaction is a Michael-type addition reaction, represented by the following equation:

(4) 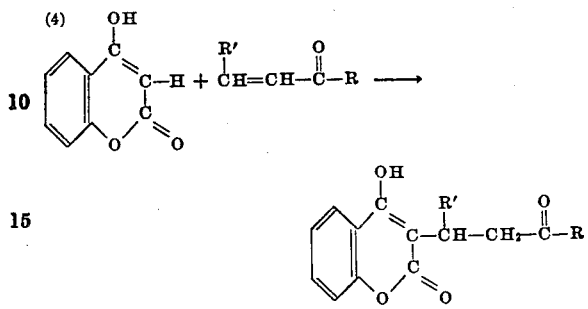

The reaction is carried out in a solvent; which is most desirably pyridine, although other solvents may be used, such for example as a lower alcohol (such as ethyl or methyl) and desirably but not necessarily in the presence of a base such for instance as pyridine or an alkali metal or an alkali-metal alcoholate, although the solvent may even be water, without any catalyst at all. It is advantageous to carry out the reaction under heat, as for instance with a reflux condenser; although this again is not necessary.

When an alcohol is used as a solvent, the reaction does not wholly stop as shown in Equation 4, with the production of products of Formula 1; but may in larger or smaller part go through a ring-closing reaction by the addition of alcohol and the elimination of water to produce a 3,4-dihydropyranocoumarin of the following general formula:

(5) 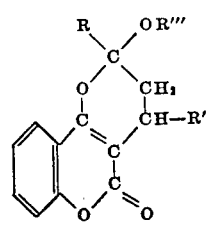

in which R''' is the alkyl group of the alcohol. The compounds of Formula 5, however, and the process of making them, are the subject-matter of our co-pending application Serial No. 586,048, filed April 2, 1945; and so are not included in this application.

In the preferred manner of carrying out our process, we produce a condensation of the 4-hydroxycoumarin with the desired α-β-unsaturated ketone by refluxing the reactants in two to three times their weight of pyridine. We desirably use equal molecular amounts of the reactants. The refluxing is desirably continued for at least four or five hours, and may continue for as long as twenty-four to forty-eight hours; and when there is difficulty in obtaining condensation the longer refluxing time is desirable. After the refluxing, the reaction mixture is poured into several times its volume of water (generally about ten to twenty volumes of water), and the mixture is then made quite strongly acid (about pH 2), as by the addition of hydrochloric acid. Thereupon an oil separates out, and on standing and cooling that oil solidifies. This solid may be recrystallized from ethanol, for purification.

The following are examples of our invention:

*Example 1.—3-(1'-methyl-2'-acetyl)-ethyl-4-hydroxycoumarin*

About 0.1 mole each of 4-hydroxycoumarin and ethylidene acetone are dissolved, in any desired order, in about three times their combined weight of pyridine. The solution is refluxed for about twenty-four hours, and then allowed to cool; after which it is poured into about fifteen volumes of water, and acidified to about pH 2 by the addition of hydrochloric acid. An oil separates, and on cooling and standing overnight solidifies. The solid product is recovered, as by filtration, and recrystallized from ethanol. The yield is about 44%. The recrystallized product is the desired 3-(1'-methyl-2'-acetyl)-ethyl-4-hydroxycoumarin, which melts at approximately 141° C. It is a white crystalline solid, soluble in hot ethyl alcohol, and substantially insoluble in cold water; and is soluble in dilute alkalis, to form solutions of the alkali salt. On analysis it shows the following:

Formula, $C_{14}H_{14}O_4$; carbon, calculated 68.3%, found 68.0%; hydrogen, calculated 5.7%, found 5.5%.

The reaction for forming it is indicated by the following equation:

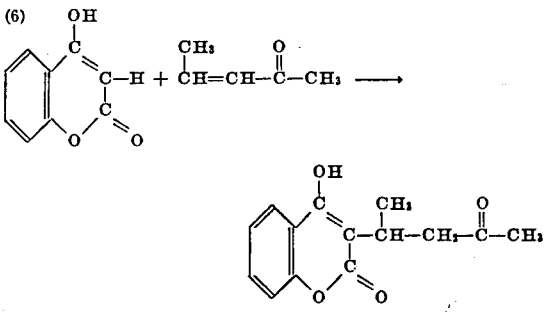

*Example 2.—3-(1'-phenyl-2'-benzoyl)-ethyl-4-hydroxycoumarin*

The process of Example 1 is repeated, save that instead of using ethylidene acetone we use benzalacetophenone. This gives the desired 3-(1'-phenyl-2'-benzoyl)-ethyl-4-hydroxycoumarin. The reaction is represented as follows:

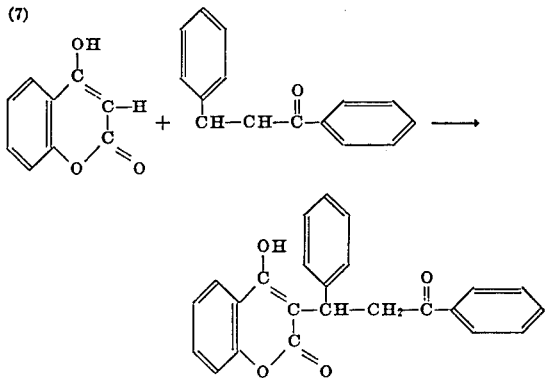

This product melts at about 160° C. It is a white crystalline solid, soluble in hot ethyl alcohol, and substantially insoluble in cold water; and dissolves in alkali solutions with formation of the salt. The yield is about 37%. Analysis of the final product shows:

Formula, $C_{24}H_{18}O_4$; carbon, calculated 77.8%, found 77.7%; hydrogen, calculated 4.9%, found 5.0%.

*Example 3.—3-(1'-phenyl-2'-benzoyl)-ethyl-4-hydroxycoumarin—Alternative method*

Example 2 is repeated, save that instead of using 3 volumes of pyridine as the solvent, we use about 5 volumes of ethanol; and use about 0.06 mole of each of the two reactants, reflux the mixture for 36 hours, add about 15 additional volumes of hot water to the hot reaction mixture, and then cool to 0° C. for about 12 hours. A heavy gum separates. The aqueous alcohol layer is decanted from the gum, and the gum is extracted with a large quantity of boiling water, about 1½ liters. The gum then remaining is extracted four or five times with 125 cc. portions of 0.05% cool aqueous sodium hydroxide solution. The several alkaline extracts are combined, and acidified to about pH 2, as with hydrochloric acid. A solid separates, and is collected by filtration and crystallized from an ethanol-water mixture. The yield is about 30%; and the recrystallized product has substantially the same melting point and analysis as that obtained in Example 2.

In Example 3, a base, such as sodium, sodium ethylate, piperidine, or pyridine, may be added to the ethanol in forming the reaction mixture. The addition of the base, however, is not necessary, and does not change the character of the product at all, and affects the yield only comparatively slightly.

*Example 4.—3-(1'-phenyl-2'-acetyl)-ethyl-4-hydroxycoumarin*

Example 1 is repeated, save that instead of using ethylidene acetone we use benzalacetone to react with the 4-hydroxycoumarin. This gives the desired 3-(1'-phenyl-2'-acetyl)-ethyl-4-hydroxycoumarin. The reaction is represented as follows:

(8)
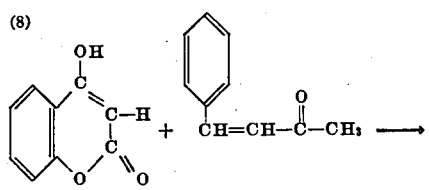

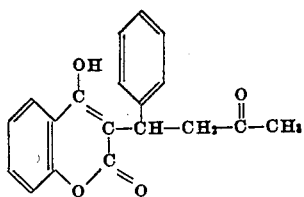

This product melts at about 161° C. It is a white crystalline solid, soluble in hot ethyl alcohol, and substantially insoluble in cold water; and dissolves in alkali solutions with formation of the salt. The yield is about 40%. Analysis of the final product shows:

Formula, $C_{10}H_{16}O_4$; carbon, calculated 74.0%, found 74.2%; hydrogen, calculated 5.2%, found 5.4%.

*Example 5.—3 - (1' - phenyl - 2' - acetyl) ethyl-4-hydroxycoumarin—Alternative method*

In making the product of Example 4, we may use water instead of pyridine as the solvent. Thus 30 g. (0.54 mole) of 4-hydroxycoumarin and 27 g. (also 0.54 mole) of benzalacetone are put in about a half a liter of water, and the whole refluxed for about 12 hours. The mixture is cooled to 0° C. overnight. A heavy gum separates. The aqueous phase is removed by decantation, and the residue (the gum) is crystallized from an acetone-water mixture. The yield is somewhat higher than in Example 4, for it is about 48%. Analysis of the product shows values substantially the same as those obtained in Example 4. The melting point of the product is substantially the same as in Example 4.

*Example 6.—3 - (1' - anisyl - 2' - acetyl) -ethyl-4-hydroxycoumarin*

Example 1 is repeated, save that instead of using ethylidene acetone we use anisalacetone to condense with the 4-hydroxycoumarin. This gives the desired 3-(1'-anisyl-2'-acetyl)-ethyl-4-hydroxycoumarin. The reaction is represented as follows:

(9)
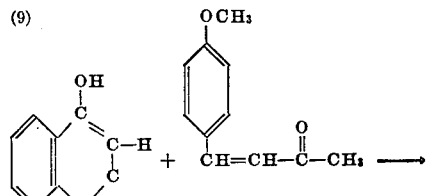

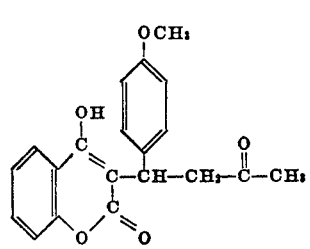

This product melts at about 160° C. It is a white crystalline solid, soluble in hot ethyl alcohol, and substantially insoluble in cold water; and dissolves in alkali solutions with formation of the salt. The yield is about 45%. Analysis of the final product shows:

Formula, $C_{20}H_{18}O_5$; carbon, calculated 71.0%, found 70.9%; hydrogen, calculated 5.3%, found 5.2%.

*Example 7.—3 - [1' - (p - hydroxy - m-methoxyphenyl) -2'-acetyl]ethyl-4-hydroxycoumarin*

Example 1 is repeated, save that instead of ethylidene acetone vanillylalacetone is used to condense with the 4-hydroxycoumarin. This gives the desired 3-[1'-(p-hydroxy-m-methoxyphenyl) - 2' - acetyl]ethyl-4-hydroxycoumarin. The reaction is represented as follows:

(10)
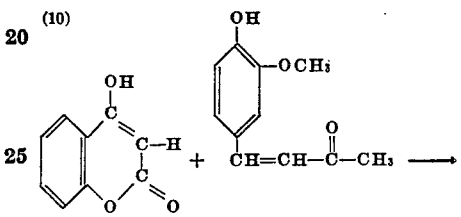

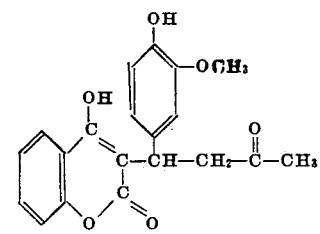

This product melts at about 181° C. It is a white crystalline solid, soluble in hot ethyl alcohol, and substantially insoluble in cold water; and dissolves in alkali solutions with formation of the salt. The yield is about 18%. Analysis of the final product shows:

Formula, $C_{20}H_{18}O_6$; carbon, calculated 67.8%, found 68.0%; hydrogen, calculated 5.1%, found 5.2%.

*Example 8. — 3-(1'-phenyl-2'-salicylyl) -ethyl-4-hydroxycoumarin*

The process of Example 1 is repeated, save that instead of using ethylidene acetone we use benzal-o-hydroxyacetophenone. This gives the desired 3 - (1' - phenyl -2'- salicylyl) -ethyl-4-hydroxycoumarin. The reaction is represented as follows:

(11)
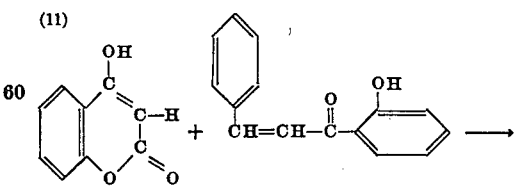

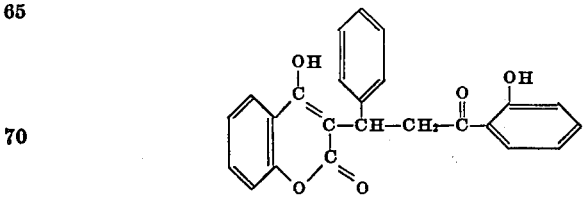

This product melts at about 194° C. It is a white crystalline solid, soluble in hot ethyl alcohol, and substantially insoluble in cold water; and dissolves in alkali solutions with formation of the salt. The yield is about 34%. Analysis of the final product shows:

Formula, $C_{24}H_{18}O_5$; carbon, calculated 74.6%, found 74.8%; hydrogen, calculated 4.7%, found 4.6%.

The products of this invention, including specifically those of the foregoing examples, are all anti-coagulants of fairly high potency—although all are lower in potency than is 3,3'-methylenebis-(4-hydroxycouramin). Their observed relative anti-coagulant indexes (taking that of 3,3'-methylenebis(4-hydroxycouramin) as 100) are as follows:

| Anti-Coagulant | Relative Anti-Coagulant Index |
| --- | --- |
| 3-(1'-Methyl-2'-Acetyl)-Ethyl-4-Hydroxycoumarin | 0.8 |
| 3-(1'-Phenyl-2'-Benzoyl)-Ethyl-4-Hydroxycoumarin | 6.0 |
| 3-(1'-Phenyl-2'-Acetyl)-Ethyl-4-Hydroxycoumarin | 21.0 |
| 3-(1'-Anisyl-2'-Acetyl)-Ethyl-4-Hydroxycoumarin | 50.0 |
| 3-[1'-(p-Hydroxy-m-Metoxy-Phenyl)-2'-Acetyl]Ethyl-4-Hydroxycoumarin | 12.0 |
| 3-(1'-Phenyl-2'-Salicylyl)-Ethyl-4-Hydroxycoumarin | 1.1 |

These compounds are all administrable orally.

We claim as our invention:

1. The new 3-substituted 4-hydroxycouramins, having the following general formula:

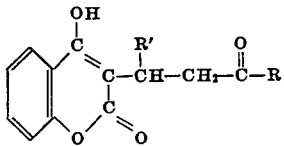

in which R represents a member of the class consisting of alkyl groups, the phenyl group, and hydroxy-substituted phenyl groups, and R' represents a member of the class consisting of alkyl groups, the phenyl group, and phenyl groups containing a substituent of the class consisting of the hydroxy group and the methoxy group in at least one of the para and meta positions.

2. The new 3-substituted 4-hydroxycoumarins as set forth in claim 1, in which R is methyl.

3. The new 3-substituted 4-hydroxycoumarins as set forth in claim 1, in which R' is phenyl.

4. The new 3-substituted 4-hydroxycoumarins as set forth in claim 1, in which R' is a methoxyphenyl.

5. The new 3-substituted 4-hydroxycoumarins as set forth in claim 1, in which R' is p-methoxyphenyl.

6. The new 3-substituted 4-hydroxycoumarins as set forth in claim 1, in which R' is p-hydroxy-m-methoxyphenyl.

7. The new 3-substituted 4-hydroxycoumarins as set forth in claim 1, in which R is methyl and R' is phenyl.

8. The new 3-substituted 4-hydroxycoumarins as set forth in claim 1, in which R is methyl and R' is a methoxyphenyl.

9. The new 3-substituted 4-hydroxycoumarins as set forth in claim 1, in which R is methyl and R' is p-methoxyphenyl.

10. The new 3-substituted 4-hydroxycoumarins as set forth in claim 1, in which R is methyl and R' is p-hydroxy-m-methoxyphenyl.

11. The process of making 3-substituted 4-hydroxycoumarins, of the following general formula:

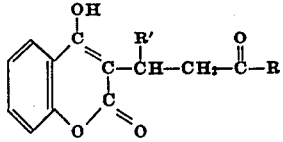

in which R represents a member of the class consisting of alkyl groups, the phenyl group, and hydroxy-substituted phenyl groups, and R' represents a member of the class consisting of alkyl groups, the phenyl group, and phenyl groups containing a substituent of the class consisting of the hydroxy group and the methoxy group in at least one of the para and meta positions; which consists in condensing 4-hydroxycoumarin with an α-β-unsaturated ketone of the following general formula:

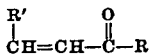

in which R and R' have the same meaning as before.

12. The process of making 3-substituted 4-hydroxycoumarins as set forth in claim 11, in which R is methyl.

13. The process of making 3-substituted 4-hydroxycoumarins as set forth in claim 11, in which R' is phenyl.

14. The process of making 3-substituted 4-hydroxycoumarins as set forth in claim 11, in which R' is a methoxyphenyl.

15. The process of making 3-substituted 4-hydroxycoumarins as set forth in claim 11, in which R' is a p-methoxyphenyl.

16. The process of making 3-substituted 4-hydroxycoumarins as set forth in claim 11, in which R' is p-hydroxy-m-methoxyphenyl.

17. The process of making 3-substituted 4-hydroxycoumarins as set forth in claim 11, in which R is methyl and R' is phenyl.

18. The process of making 3-substituted 4-hydroxycoumarins as set forth in claim 11, in which R is methyl and R' is a methoxyphenyl.

19. The process of making 3-substituted 4-hydroxycoumarins as set forth in claim 11, in which R is methyl and R' is p-methoxyphenyl.

20. The process of making 3-substituted 4-hydroxycoumarins as set forth in claim 11, in which R is methyl and R' is p-hydroxy-m-methoxyphenyl.

MARK A. STAHMANN.
MIYOSHI IKAWA.
KARL PAUL LINK.

REFERENCES CITED

The following references are of record in the file of this patent:

Stahmann et al., Journal American Chemical Society, 65, pp. 2285–7 (1943).

Sullivan et al., Journal American Chemical Society, 65, pp. 2288–91 (1943).

Certificate of Correction

Patent No. 2,427,578.   September 16, 1947.

MARK A. STAHMANN ET AL.

It is hereby certified that error appears in the printed specification of the above numbered patent requiring correction as follows: Column 5, lines 63 to 65, inclusive, Example 6, for that portion of the formula reading

and that the said Letters Patent should be read with this correction therein that the same may conform to the record of the case in the Patent Office.

Signed and sealed this 2d day of December, A. D. 1947.

[SEAL]

THOMAS F. MURPHY,
*Assistant Commissioner of Patents.*